United States Patent [19]

Bendig

[11] 4,451,701
[45] May 29, 1984

[54] VIEWDATA SYSTEM AND APPARATUS

[75] Inventor: Mark W. Bendig, Columbus, Ohio

[73] Assignee: OCLC Online Computer Library Center, Incorporated, Dublin, Ohio

[21] Appl. No.: 540,701

[22] Filed: Oct. 11, 1983

Related U.S. Application Data

[63] Continuation of Ser. No. 202,189, Oct. 30, 1980, abandoned.

[51] Int. Cl.³ .......................................... H04M 11/08
[52] U.S. Cl. ................................. 179/2 TV; 179/2 A; 358/85; 340/711
[58] Field of Search .............. 179/2 TV, 2 A; 358/85; 340/706, 711

[56] References Cited

U.S. PATENT DOCUMENTS

| | | | |
|---|---|---|---|
| 3,654,708 | 4/1972 | Brudner | 35/9 A |
| 3,668,312 | 6/1972 | Yamamoto et al. | 178/6.8 |
| 3,685,039 | 8/1972 | Flanagan | 340/324 A |
| 3,757,037 | 2/1972 | Bialek | 178/6.6 A |
| 3,822,363 | 7/1974 | Moyer et al. | 179/2 TV |
| 3,872,446 | 3/1975 | Chambers | 340/172.5 |
| 3,872,446 | 3/1975 | Chambers | 340/172.5 |
| 3,909,818 | 9/1975 | Dalke et al. | 340/324 |
| 4,007,443 | 2/1977 | Bromberg et al. | 340/172.5 |
| 4,121,283 | 1/1977 | Walker | 364/200 |
| 4,150,254 | 4/1979 | Schussler et al. | 179/2 TV |
| 4,161,728 | 7/1979 | Insam | 340/750 |
| 4,191,956 | 3/1980 | Groothuis | 340/789 |

OTHER PUBLICATIONS

Lexis, "A Primer", pp. 1-17, Copyright 1980 (Trade Bulletin).

Primary Examiner—Harold I. Pitts
Assistant Examiner—James L. Dwyer
Attorney, Agent, or Firm—Mueller and Smith

[57] ABSTRACT

A viewdata system and decoder apparatus for providing interactive communication between a host computer and a consumer which utilizes, without modification, a conventional television receiver. The system utilizes telephonic communication, the handset of a telephone being positioned upon an acoustic coupling arrangement of the housing of the decoder. The decoder automatically carries out logon and logoff procedures through the utilization of memory retained character sequence which are transmitted at predetermined rates. A small, hand-held keypad provides for user interaction with the host computer, such keypad being coupled with the decoder housing through an elongate cable.

17 Claims, 10 Drawing Figures

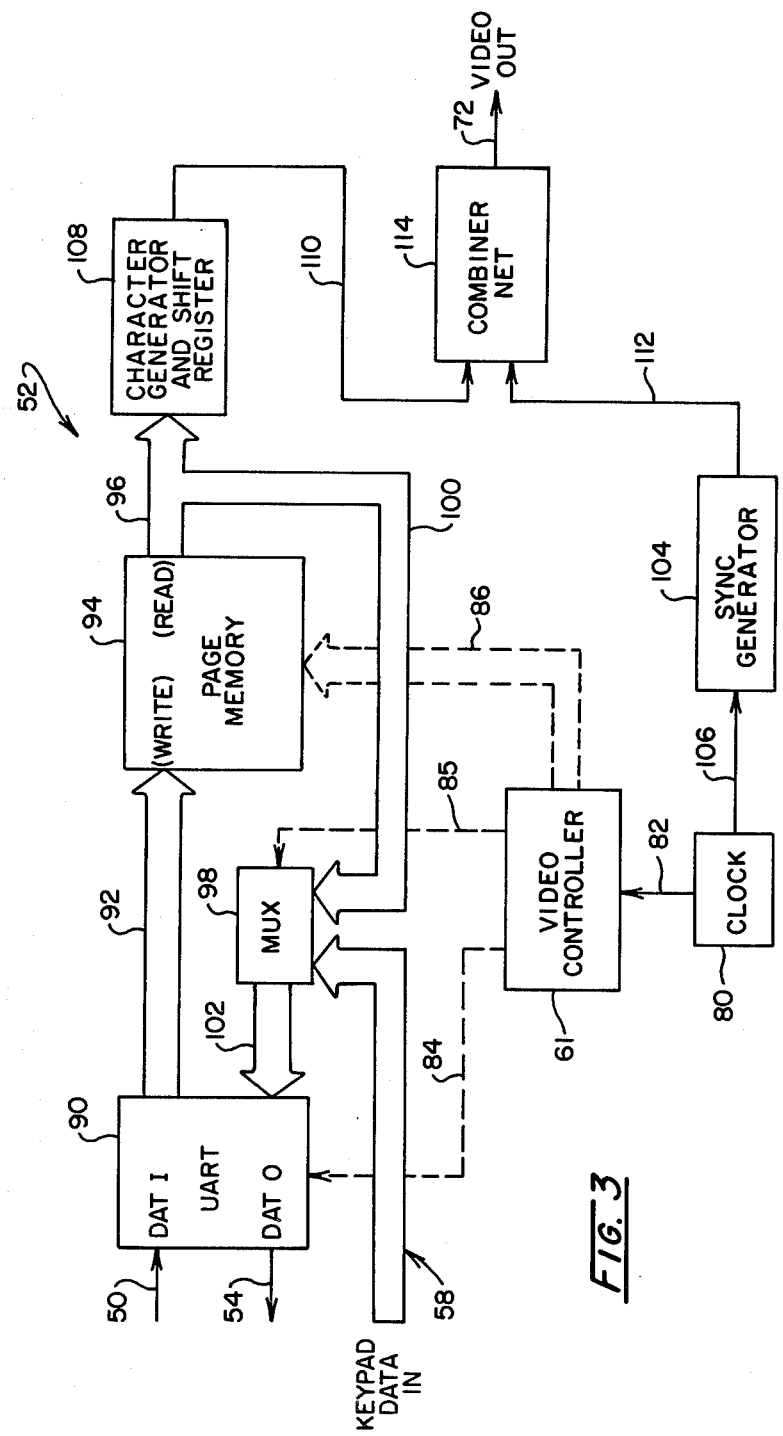

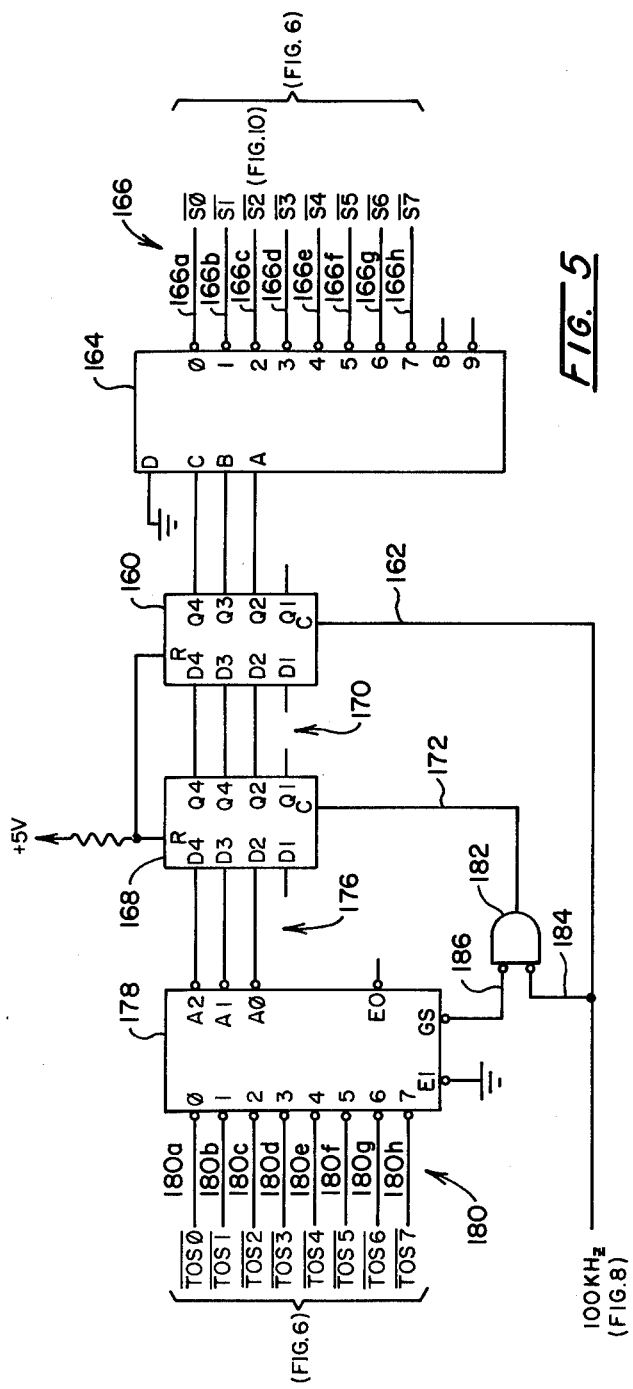
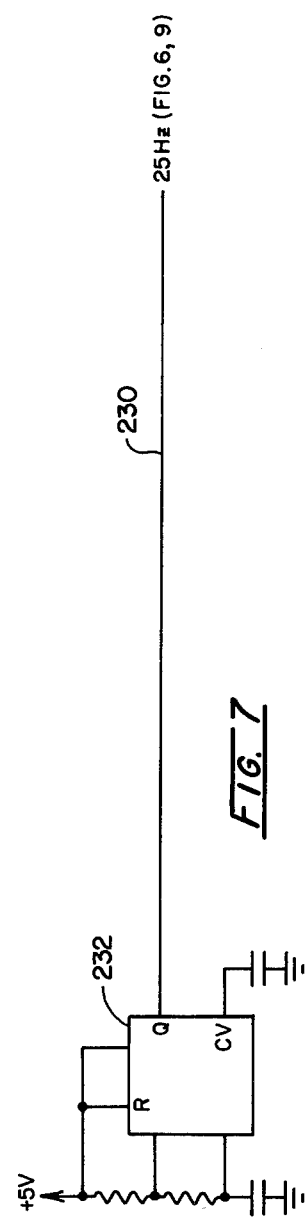
FIG. 5
FIG. 7

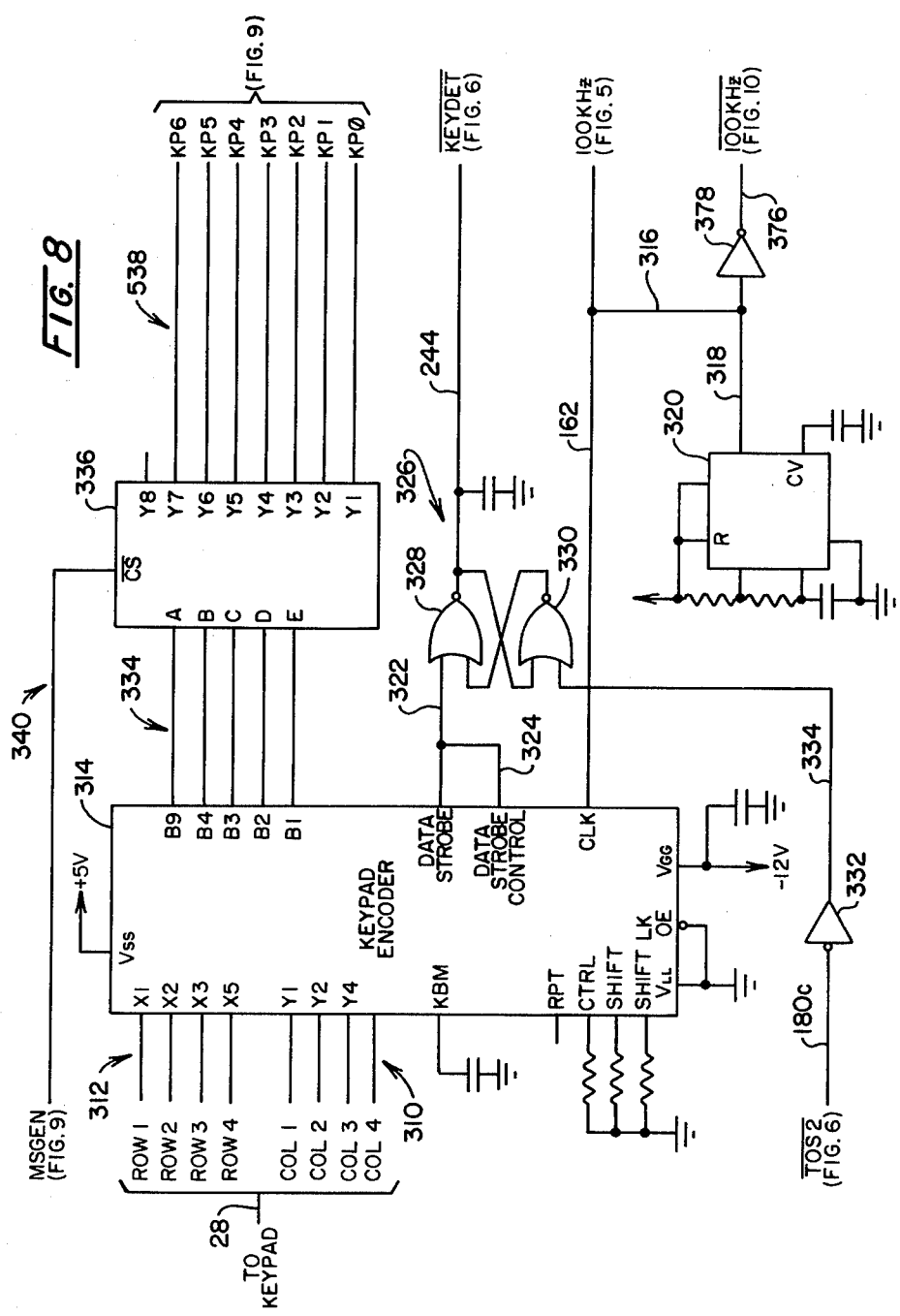

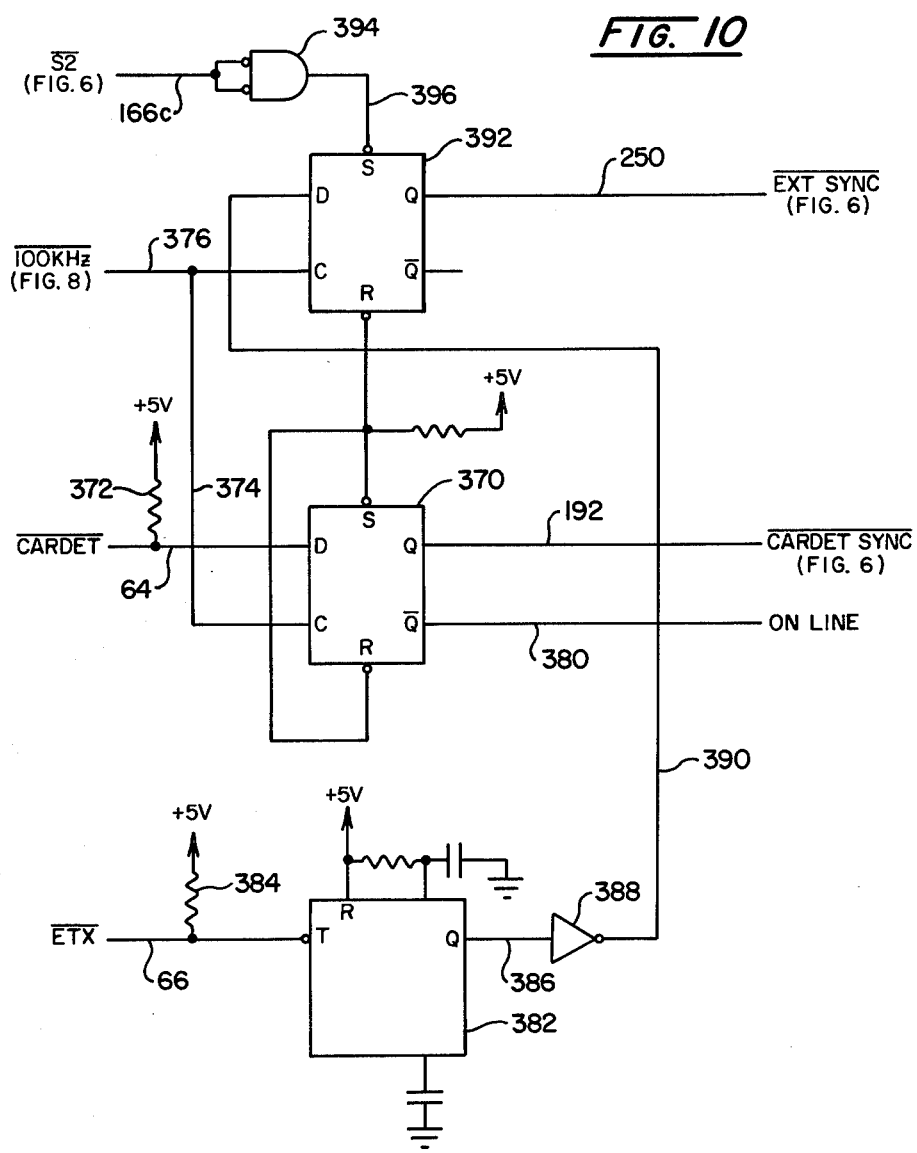

VIEWDATA SYSTEM AND APPARATUS

This application is a continuation now abandoned, of application Ser. No. 06/202,189, filed Oct. 30, 1980.

BACKGROUND

With the evolution of large data base capability in centralized computer facilities, interest has been generated in providing for an expanded distribution of information to the consuming public. Interactive computer terminals serving to provide keyboard generated communication via telephonic links with centralized or host computer stations have been in general use for a considerable period of time. Such terminals generally depend on trained personnel for their operation, a series of coded instruction signals being generated by an operator at the keyboard to gain access to the host computer (logging on) as well as for purposes of terminating access (logging off). For example, these codes may identify the terminal, an account number, a password, the type of terminal, i.e. CRT screen and/or printer, and the management level of the operator. Generally, the codes are developed as a predetermined sequence or string of selected ones of the available 128 ASCII characters.

An expansion of the distribution of data base information to a broader segment of the public has been considered most desirable. In this regard, community and national news information, public library catalogs and attendant provision of library books by mail, encyclopedia-derived information and banking services represent only a minor portion of information which may be derived from a host computer. Approaches to providing such information to the public have looked to the ubiquity of television systems, video receivers now being essentially universally present in the homes of the consuming public. One such approach is referred to as a "teletext" system wherein graphic material is broadcast to T.V. viewers from an existing television station. Viewer control over the content and timing of such data transmission may be limited, depending upon system design, and user interaction with the computer information source generally is not provided. Additionally, a modification of each receiver is required for the system. Where interactive capabilities are contemplated for the teletext systems, the ensuing complexity renders their widescale use somewhat questionable at present.

Another approach to providing lower cost home information service is predicated upon the joint utilization of telephonic communication links and standard home television receivers. Described as "viewdata" technology, the system contemplates a provision of some form of an adapter or decoder which is accoustically coupled through the user's telephone to a remote host computer facility. Thus, the standard T.V. receiver and telephone network are advantageously combined for operation in another information dissemination mode. To become effective, however, such viewdata systems must access large numbers of the consuming public and, for such extensive access, the investment required of each consumer or user must be relatively low. Thus, customized or specially adapted television receivers cannot be resorted to, connection or association with the host computer being required to be carried out by simple connection to the T.V. receiver antenna terminals.

Another requisite for achieving widespread consumer acceptance and use of viewdata systems resides in a need to simplify the operation of the consumer operated terminal. In this regard, the consumer cannot be required to undertake and carryout conventional access operations for properly logging on or logging off of the host computer program. Further, where program interruptions or like down periods are encountered, the consumer cannot be called upon to undertake proper remedial or restart procedures. Also, where user mistakes are made at the terminal keyboard, the anticipated viewdata system consumer cannot be expected to understand and carry out proper corrective procedures.

In view of the foregoing, it may be observed that a practical design approach to viewdata type information system requires a decoding arrangement for associating a host computer via telephonic linkage with a conventional T.V. receiver without resort to T.V. modification; which provides operational association between the consumer operator and the host computer in a highly simplified fashion; and which accomplishes the foregoing at acceptable cost levels.

SUMMARY OF THE INVENTION

The present invention is addressed to a viewdata system and apparatus wherein interactive telephonic communication may be provided between a consumer-user from, for example, a home-based terminal and a host computer. System costs are minimized through an arrangement wherein the user's own conventional television receiver provides required visual readout but without the need for modification thereto. In this regard, a decoder is utilized, the output of which simply is connected to the antennae terminals of the television receiver. Of particular importance, the decoder of the system permits such simplified interaction with the host computer as to lend the system's use to non-computer trained consumers. For example, logging on and logging off interactive procedures are automatically carried out, logging on procedures requiring only that the user dial a telephone number accessing the host computer and position the telephone handset onto an acoustic coupler device. Following this procedure, tree-structured data base programs of the host computer permit the carrying out of information access by transmitting informational characters through the decoder to the screen of the television receiver. Interactive communication on the part of the user is carried out by depression of select ones of a relatively small number of selection keys of a correspondingly small, hand-held keypad assembly attached by an elongate caple to the decoder housing. Simplicity of the decoder use is further enhanced through the integral mounting of the acoustic coupler components with the relatively small housing of the decoder itself. In the course of the fully automatic logging on operation of the decoder, the identification of the terminal or user automatically is provided to the host computer. As a consequence, programs may be provided wherein through the simple depression of one or two keys of the keypad assembly, the user may instruct the system to mail books to his address and the like. Additionally, banking procedures may be carried with adequate security through the utilization of memory base terminal identification codes and the like.

Another feature and object of the invention is to provide a viewdata system for selectively disseminating information from the data base of a host computer via telephonic communication to provide data characters at the screen of a television receiver. The system incorporates a host computer which is responsive to predetermined telephonic communications for providing an acknowledging signal and subsequently is responsive to a telephonic communication present as signals representing a predetermined sequence of logon characters to transmit character signals representing nodes of data. The system further includes a television receiver having conventional antennae terminals and a decoder. The decoder arrangement includes an acoustic coupling arrangement for providing select, interactive telephonic communication with the host computer when operatively associated with the handset of a telephone. A keypad arrangement is provided having a plurality of manually actuable keys, each corresponding with a character defined function for interactive communication with the host computer. The decoder further incorporates a memory which is addressable at first locations to provide first output signals corresponding with a string of logon characters and is addressable at second locations for providing second output signals corresponding with the keypad character defined functions. The decoder incorporates a circuit which is responsible to the acoustic coupling arrangement for generating video signals corresponding with the host computer transmitted character signals; which is responsive to the host computer acknowledging signal when received by the acoustic coupling arrangement for addressing the memory first locations and effecting automatic sequential transmission to the host computer through the acoustic coupling arrangement of the first output signals at a predetermined rate and which is further responsive to the actuation of given keys within the keypad assembly for addressing appropriate second location of memory and effecting a transmission to the host computer through the acoustic coupling arrangement of the second output signals. The decoder further includes an R.F. modulator having an output which is connected to the television receiver antennae terminals and which modulates the video signals with a select carrier determined by T.V. receiver channel selection for effecting the imaging at the raster thereof.

Another object of the invention is to provide a decoder apparatus and system as above described in which the circuit of the decoder is responsive to the acknowledging signal when received at the acoustic coupling arrangement for commencing a delay interval of predetermined duration and is responsive to the termination of that delay interval for addressing the memory first locations. Generally, the rate of addressing these memory locations will approximate the acceptance level of conventional telephone lines, for example, about 250–300 baud.

As another feature and object of the invention, a system and decoder apparatus as above described are provided wherein the decoder includes a visual means for providing a perceptible system status indication when activated. The circuit of the decoder is responsive to the noted acknowledging signal for activating this visual arrangement.

As another object of the invention, the decoder and system of the invention provides for the automatic logging off of the home base terminal through the automatic transmission of a sequence or string of predetermined logoff characters.

Other objects of the invention will, in part, be obvious and will, in part, appear hereinafter. The invention, accordingly, comprises the system and apparatus possessing the construction, procedures, combination of elements and arrangement of parts which are exemplified in the following detailed disclosure.

For a fuller understanding of the nature and objects of the invention, reference should be had to the followed detailed description taken in connection with the accompanying drawings.

BRIEF DESCRIPTION OF THE DRAWINGS

FIG. 3 is a block schematic diagram of a video terminal circuit utilized with the decoder of the invention;

FIG. 5 is a circuit diagram showing state latching components of the controller circuit of the decoder of the invention;

FIG. 7 is a circuit diagram showing a transmission clock of the controller circuit of the decoder of the invention;

FIG. 8 is a circuit diagram showing the keypad assembly scanning and memory components of the controller circuit of the decoder of the invention;

FIG. 10 is a circuit diagram showing synchronizing components of the controller circuit of the decoder of the invention.

DETAILED DESCRIPTION

Figure 1:
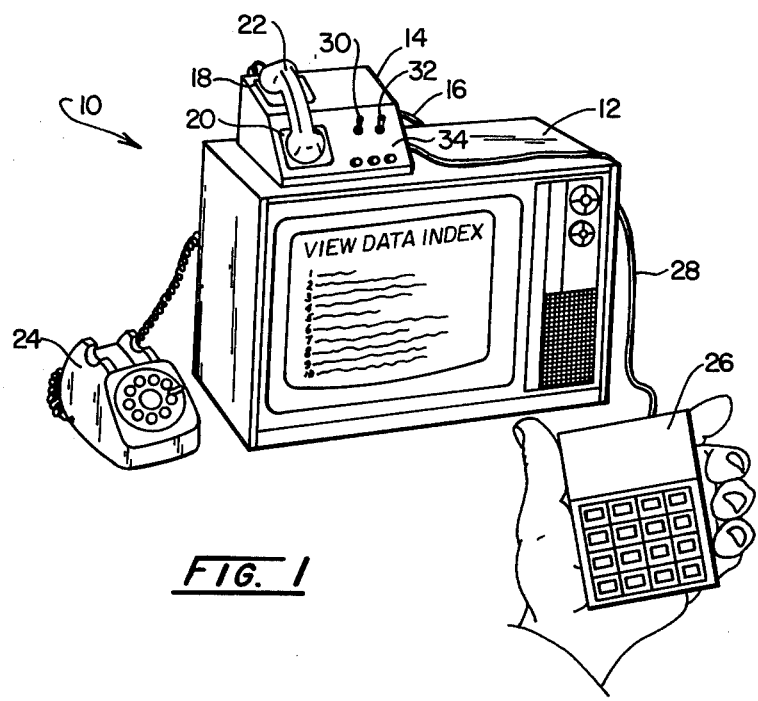
FIG. 1 is a pictorial representation of a terminal according to the invention, showing a conventional T.V. receiver, telephone and decoder.

The viewdata system and apparatus of the invention provides a consumer or user terminal which may be available in the home operating in conjunction with a conventional T.V. receiver. This system is substantially automatic and self-prompting such that it may be utilized with little instruction by non-computer-oriented operators. Looking to FIG. 1, a user terminal arrangement is represented pictorally generally at 10 and is shown to comprise a conventional television receiver 12 upon which is placed decoder apparatus 14. Decoder 14 is shown in an operative orientation, a shielded cable 16 extending therefrom to a connection (not shown) with the antenna input terminals of receiver 12. Integrally formed within decoder 14 is an acoustic coupler fashioned of integrally structured muffs or couplers 18 and 20 which are arranged to receive the handset 22 of a conventional telephone 24. Additionally coupled to decoder 14 is a small, hand-held keypad assembly 26, such coupling being provided by an elongate cable 28 which permits the user to interact within the system from a convenient remote position suited to permit facile viewing of the system output at the screen of receiver 12. As compared with a typical keyboard utilized in conjunction with computer terminals, keypad 26 has relatively fewer keys, for example 16, in keeping with the philosophy of the system to provide a quite simple user interface.

Decoder 14 also incorporates a conventional on-off switch 30. A perceptible status arrangement including selectively illuminated light-emitting diodes (LEDs) is shown generally at 34. These LEDs may, for example, provide a power on-off indication, a standby indication and an Online indication.

Terminal arrangement 10 operates in conjunction with a host computer which incorporates a tree structured data base of a variety when wherein a "menu" or similar selection of categories may be provided along with numerical identification at the screen of receiver 12. The operator selects categories or nodes within the menu by the simple depression of appropriately numbered keys within keypad assembly 26. Such selection also is accompanied by operational or functional selection key depressions exemplary ones of which are discussed later herein.

Figure 2:
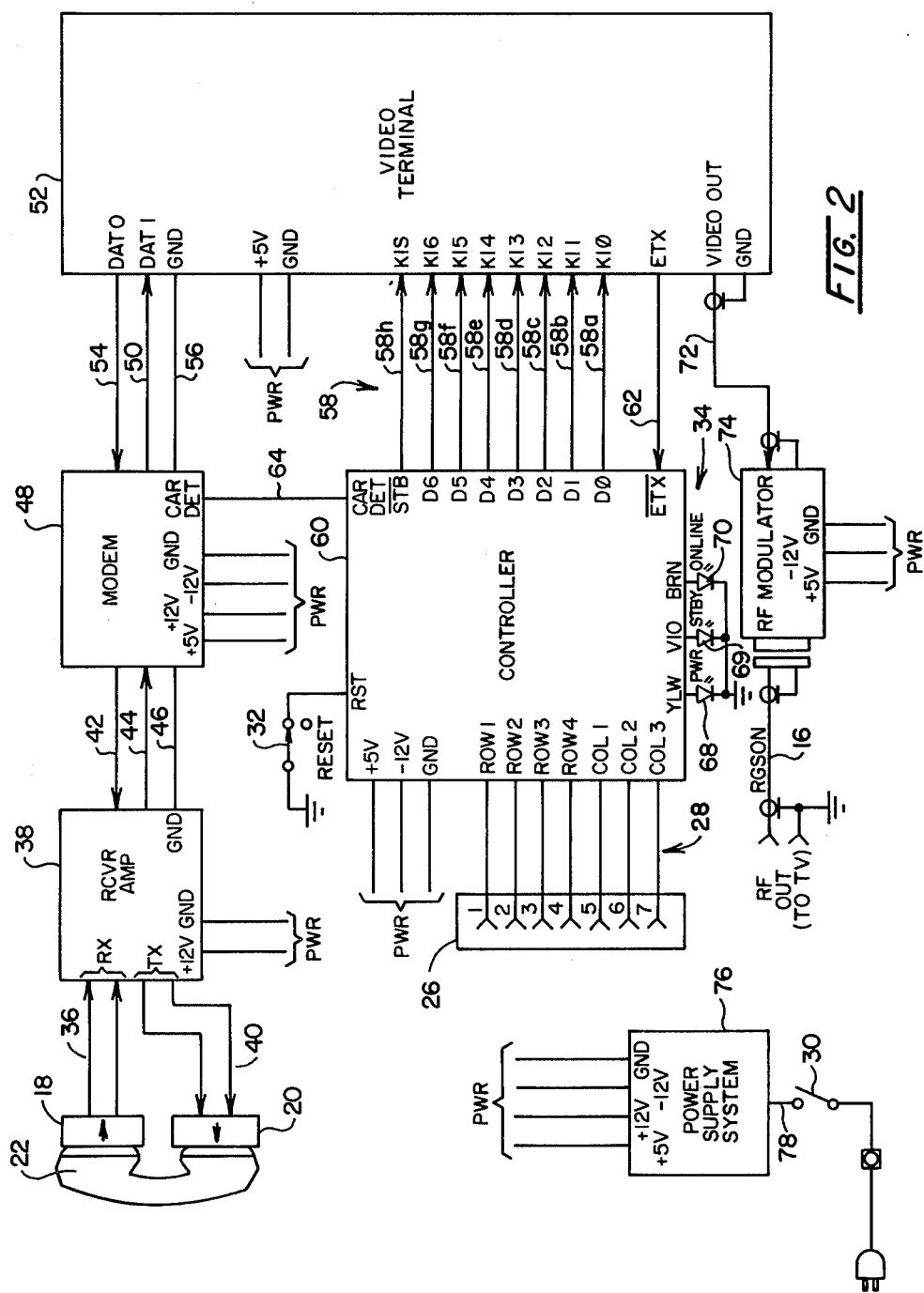
FIG. 2 is a block schematic diagram of the decoder utilized with the system of the invention.

Referring to FIG. 2, a schematic representation of the components of decoder 14 are revealed in a higher level of detail. Handset 22 again is revealed in schematic form as being associated with acoustic couplers or muffs 18 and 20. As represented by the arrows associated with each, the receiving output of coupler 18 is directed along two lines represented at 36 to a receiver amplification stage 38. Similarly, transmitted signals are provided along two line grouping 40 from stage 38 to acoustic coupler 20. Amplification stage 38 is shown coupled via respective transmit and receive lines 42 and 44 as well as ground line 46 to the inputs of a modem circuit represented generally at 48. In conventional fashion, the modem circuit 48 serves to convert digital signals introduced thereto to tones for transmission via acoustic coupler 20, while, correspondingly, tones received from acoustic coupler 18 having been amplified at network 38 are converted to digital signals. The digital output of modem circuit 48 is presented along line 50 to a video terminal circuit 52, while the digital input from the latter is provided along line 54 to modem circuit 48. Note that line 54 is shown being introduced to the data out (DATO) terminal of video terminal circuit 52, while line 50 is coupled to the data in (DATI) terminal thereof. The ground or reference coupling between modem circuit 48 and video terminal 52 is represented at line 56. Inasmuch as the signals to and from the video terminal circuit 52 are at RS 232 levels, the circuit is modified to provide a TTL interface at its DATO and DATI terminals. Video terminals 52 are available in the marketplace, an exemplary one being identified as "ESAT-100" marketed by Priarity One Electronics, Sepulneda, California and serve to interact with both incoming and outgoing data derived either from actuation of keypad 26 or from the host computer. Such signals or data are then transformed at the video terminal function to provide an appropriate readout at the screen of receiver 12.

The orchestration of the operation of video terminal circuit 52 is derived from a controller circuit 60 which responds to the row-column output signals of keypad 26 through line grouping 28 as well as to a carrier detect (CARDET) signal at line 64 emanating from modem circuit 48. Additionally, a host computer derived $\overline{EXT}$ signal is received by controller circuit 60 from video terminal circuit 52 at line 66. The reset switch 32 is shown in the figure as being coupled between ground and the RST terminal of controller circuit 60, while the perceptible status arrangement 34 is shown as comprising three LEDs 68, 69, and 70, respectively indicating power on, standby and online. Controller circuit 60 serves the function of carrying out the operational procedures required for effecting proper contact with the host computer (logging on) as well as for terminating such contact following an interactive session (logging off). Its performance in this regard is described later herein in a higher level of detail.

The video output of video terminal circuit 52 is directed along coaxial line 72 to an RF modulator 74. Within modulator 74, the video signal is impressed upon a carrier at the frequency of the receiver 12 output channel desired. Accordingly, the output of modulator 74 at coaxial cable 16 may be coupled directly to the terminals of a television antenna. RF modulator circuit 74 may include, as a principal component, for example, a type LM1889 TV modulator marketed by ATV Research, Dakota City, Nebraska. Power supplies are represented in the drawing as labeled inputs. The source of such inputs is represented at block 76 in connection with a typical a.c. input represented at line 78 which line incorporates power on-off switch 30. Such power supply arrangements are available in the marketplace, for example, as a catalog number 277-104 used for +12 v and −12 v only and producted by Tandy Corporation, Fort Worth, Texas.

With the arrangement shown in FIG. 2, the operator of the remote terminal need only actuate switch 30 to turn the system on, dial a predetermined number for contact via telephone line to the host computer and, optionally, listen for the carrier tone from the host. Upon hearing the tone, the operator positions the telephone handset 22 within the acoustic couplers or muffs 18 and 20 in appropriate transmit-receive orientation, and the controller board will automatically carry out a logging on procedure wherein a sequence of control characters identifying the user are derived at the grouping of data output lines D0–D6 as well as a strobe signal, $\overline{STB}$. Note that these lines extend to corresponding terminals KI0–KIS within video terminal circuit 32. Following such logging on procedure, the host computer will provide a first page of data whereupon the operator may progressively select level related numbered categories of information for display at the screen of receiver 12.

Controller circuit 60 also retains a capability for logging the system off, for example, through the selection of a data page which is nonexistent, e.g., the number 999. With such arrangement, for example, a host computer derived $\overline{ETX}$ signal may be utilized for indicating that a sign off request has been received by the host. The controller then provides a character string or sequence of characters instructing the host computer to carry out its logoff procedures.

Referring to FIG. 3, a block diagrammatic representation of the video terminal circuit 52 is revealed. This circuit includes a video controller circuit 61 which is shown as being driven by a system clock 80 from an input represented by line 82. Control functions of the video controller 61 are represented by dashed lines 84-86 extending to the various components of video terminal circuit 52.

Data input and output is directed into the circuit 52 from earlier described lines 50 and 54 which are shown directed to a universal asynchronous receiver-transmitter (UART) represented at block 90. In conventional fashion, UART 90 converts serial data entering the circuit at line 50 into parallel data in the form of individual 8-bit words. The thus treated parallel data are directed along bus 92 to the input of a page memory 94. This is a RAM form of memory receiving 8-bit letter codes from line 92 which are positioned in memory at appropriate locations by control via line 86. The coded data represents, in effect, an image of that which appears on the screen of receiver 12. One location in memory is reserved for each possible character position of the 512 available at the screen. These characters generally will be formed as a $5 \times 7$ dot matrix which can have a maximum of 5 dots in width and 7 scan lines in height. Additionally, 2 dot widths are used for intercharacter spacing on a scan line, and 4 scan lines are used for vertical spacing in between characters. The output of memory 94 is represented as being directed through a bus 96, and this output ultimately is seen as a character representation on the raster of receiver 12.

Looking to the serial data out as derived at line 54 extending from UART 90, such outputted data derives from one of two sources, either the keypad 26 or the page memory 94. Selection of these data is made by a multiplexer (MUX) 98 which is under the control of video controller circuit 61 as represented by select line 85. Selections made by the video controller circuit 61 provide for the presentation of data from busses 96 and 100 or line grouping or bus 58 representing keypad data in. The output of multiplexer 98, as represented at bus 102, is directed to an input of UART 90 for presentation as serial data out at line 54. With the arrangement, video controller circuit 61 determines what data are to be returned to the host and, by virtue of the connection with memory 94, the host computer may be permitted to read that which is displayed at the screen of receiver 12.

In addition to providing evenly spaced pulses for use at video controller 61, the clock 80 also provides the timed signal components utilized by a sync gnerator 104 for deriving those horizontal and vertical sync pulses and the like required to evolve an NTSC compatible signal. The association of the clock 80 with sync generator 104 is represented by line 106.

Coupled to the output bus 96 of page memory 94, is a character generator and shift register represented at block 108. This network sees the codes from the page memory and converts them into shapes for evolving character definition. The resultant output thereof at line 110 represents a video signal which is combined with the sync generator output at line 112 at combiner network 114 to provide a composite video signal at line 72. As indicated earlier herein, this composite video signal is used to modulate a carrier at the selected channel T.V. frequency for submittal at the antenna terminals of receiver 12.

Figure 4:
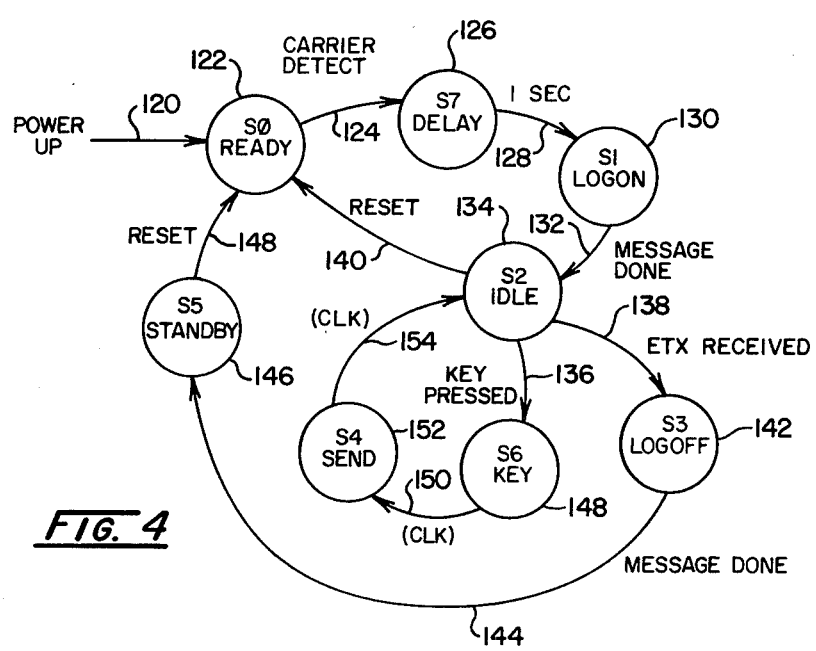
FIG. 4 is a state diagram showing the operation of the controller circuit of the decoder of the invention.

Controller circuit 60, as earlier described in connection with FIG. 2, is provided as a finite state machine, exhibiting a logic which defines a finite number of conditions or rest points. Thus, the operation of the circuit may be represented by a state diagram. Referring to FIG. 4, such a state diagram is portrayed, and the logic represented thereby will be seen to be implemented in conjunction with the discussion of FIGS. 5 & 6. Looking to FIG. 4, upon initial powerup as represented at 120, the controller 60 circuit is in a state S0 or "ready" as represented at 122. When the MODEM 48 receives the host computer derived carrier, a carrier detect or acknowledging signal, (CARDET) signal (as presented from line 64, FIG. 2) is derived and, as represented at arc 124, the circuit enters state S7 which provides a one second delay and is represented at 126. The state S7 delay assures that the host computer is in a condition for properly receiving an ensuing logon message. Accordingly, as represented at arc 128, with the timing out of the one second delay, the system enters state S1 during which state a multi-character logon message is drawn from memory and transmitted to the host computer. State S1 is represented at 130, and the logon message transmitted during such state is one, inter alia, which identifies the terminal being used and causes the host computer to enter into the appropriate viewdata program. Note that the terminal user will not have been required to provide any codes or the like at this stage of use, the system carrying on logon procedures in automatic fashion. After the logon message is sent as represented by arc 132, the system enters state S2 as represented at 134. The system remains in state S2 until such time as a key within keypad assembly 26 is pressed by the operator as represented by arc 136; unless an $\overline{\text{ETX}}$ signal is received from the host computer acknowledging a desire to logoff as represented by arc 138; or unless the reset button 32 is pressed as represented at arc 140. While in state S2, entries from the keypad 26 on the part of the operator will cycle the system through states S6 (KEY) and S4 (SEND). Each such cycle causes one character to be sent to the remote or host computer via the modem 48 and acoustic coupler 20.

As represented by arc 136, with the pressing of a key, the system transitions to state S6 (KEY) at 148, and is represented at arc 150, a clock transition will evoke a state S4 (SEND) condition as represented at 152, whereupon, as represented at arc 154, the system returns to idle state S2. Each such cycle causes one character to be sent to the host computer as noted above.

A special character sequence submitted from the keypad (a request for nonexistent page 999) or, optionally submitted from memory with controller circuit 60-logoff, will be recognized by the host computer as a signoff request, which it responds to by, example, sending an ETX character to decoder 14. The ETX character is decoded by the video terminal circuit 52 and is sent to the controller circuit 60, where it causes a state transition to state S3 which is represented in the figure at 142. As noted earlier in connection with FIG. 2, the $\overline{\text{ETX}}$ signal is presented along line 66 from video terminal circuit 52. During state S3, a logoff message is sent, terminating any given session, and after this logoff message is sent, as represented at arc 144, the system enters a standby status as represented at state S5. When in state S5, the system will respond only to a reset actuation as represented at arc 148. Accordingly, pushing reset button 32 will cause the system to transition from state S5 to state S0. If a reset condition obtains during state S2, as represented at arc 140, the system will transition through state S0, thence through states S7 and, following a one second delay, will send another logon message as represented at state S1 and enter state S2 thereafter, a condition awaiting a keypad assembly 26 input. Looking to arc 140, as indicated above, if for any reason the logon message sent during state S1 is not accepted by the host computer, the reset button may be pressed, cycling the system from state S2 through state S0 and again into state S1 causing the logon message to be retransmitted, it being recalled that the carrier tone of the host still will be detected at line 64. Thus, the system again will be ready for a keypad 26 input.

As indicated earlier, the circuits of FIGS. 5 and 6 include the components which serve to implement the operations described in connection with the state diagram of FIG. 4. Looking to FIG. 5, the signals defining the numbered state which the system may be in at any given time are derived at the Q2–Q4 terminals of a state latch 160. Latch 160 may be a D flip-flop of a type 74175, for example, marketed by Texas Instruments, Dallas, Texas, and serves to transition or shift the signal present at its input terminals D1–D4 to the corresponding Q1–Q4 outputs thereof on the occurrence of a clock pulse at its clock input terminal, C, as derived from along line 162. Inasmuch as eight states are available within the system, three outputs, Q2–Q4, are utilized in conjunction with latch 160 and the data at these output terminals represent a binary designation of state number. Terminals Q2–Q4 are coupled with corresponding A–C terminals of a state decoder 164 which serves to respond to the signals at its input terminals and provide a low output (active low) signal at a corresponding one of its output terminals 0–7. Note that the lines at line grouping 166 corresponding with terminals 0–7, respectively, are labeled $\overline{S0}$–$\overline{S7}$ representing state designations. State decoder 164, may, for example, be present as a type 7442 decoder marketed by Texas Instruments, Dallas, Texas.

The inputs to latch 160 at terminals D2–D4 are coupled by line grouping 170 to the corresponding output terminals Q2–Q4 of another latch 168. Latch 168 also may be present as a D flip-flop type 74175 identical to latch 160 and the inputs thereto at terminals D2–D4 appear at its outputs upon the occurrence of a clock pulse at its clock, C, terminal which is coupled with line 172. Latches 160 and 168 are maintained in continuous active status by virtue of the common connection of their reset terminals, R, through pull up resistor 174 to +5 v power supply.

Input terminals D2–D4 of latch 168 are coupled through line grouping 176 to the corresponding output terminals, A0–A2, of a priority encoder 178. Operating in reverse fashion as decoder 164, encoder 178 responds to an active low condition at any one of its input terminals, 0–7, to provide a binary coded output corresponding with the state number designation at its input terminals 0–7. Note, in this regard, that a line grouping 180 provides connection with terminals 0–7, the discrete lines therewithin, respectively, being labeled $\overline{TOS\ 0}$–$\overline{TOS7}$. The latter designate a signal in the nature of a command for the system to transition to a given state. Note, additionally, that an active low input within a line of grouping 180 is required to provide such a signal.

Latch 160 is clocked from a line 162, which line receives a 100 Khz input squarewave pulse from a keypad encoder described later herein in connection with FIG. 8. This pulse train is inverted and synchronized through the utilization of an AND gate 182, one active low input thereof being present at line 184 which is coupled to line 162 and the opposite active low input thereto being present at line 186 which extends to the gate select, GS, output of priority encoder 178. Line 186 assumes a logic low status in the event that a low state becomes present at any one of the input lines within grouping 180. With the arrangement, the clock inputs to state latches 160 and 168 are derived on a one pulse width spaced apart relationship.

Figure 6:
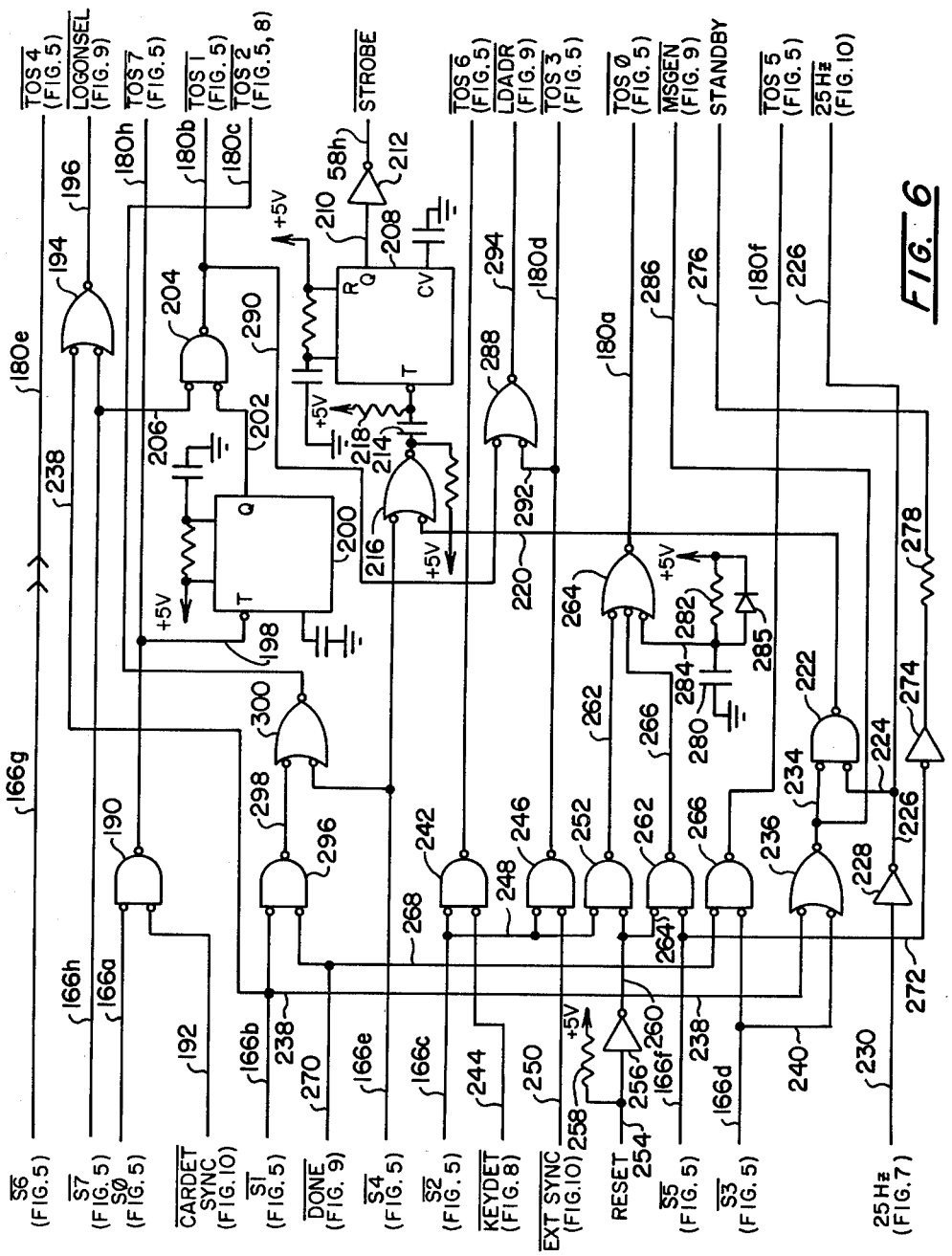
FIG. 6 is a circuit diagram showing transition logic components of the controller circuit of the decoder of the invention.

The state latch described in conjunction with FIG. 5, cooperates with a state transition circuit represented in FIG. 6. In considering the latter circuit, reference also should be made to the state diagram of FIG. 4, inasmuch as the inputs at the left side of the state transition circuit will be seen to represent state condition signals as developed, inter alia, at line grouping 166 in FIG. 5. Correspondingly, the "to state" signals impressed at line grouping 180 are seen to be derived at the right hand portion of the circuit of FIG. 6.

Recalling that a transition from state S0 to state S7 requires a carrier detect signal, the $\overline{S0}$ signal is shown directed to one active low input of AND gate 190 from along line 166a. The opposite input to gate 190 as present at line 192 carries a $\overline{\text{CARDET SYNC}}$ signal representing a sychronized carrier detect signal derived ultimately from modem 48. With the presence of active low inputs from lines 166a and 192, the output of gate 190 at line 188 assumes a corresponding low status. This provides a $\overline{TOS7}$ low signal at the input to priority encoder 178 which results, upon appropriate clock transitions, in the alteration of the output of state decoder 164 such that line 166a reverts to a high to cancel the state S0 condition and line 166h assumes a low condition providing a state S7 which is represented as $\overline{S7}$. With this transition to state S7, the state S0 signal transition to a high value at line 166a, in turn, causes the output of gate 190 to assume a high status and the signal $\overline{TOS7}$ is eliminated. Signal $\overline{S7}$, representing state S7, is present at line 166h of line grouping 166 and is shown extending to one active low input of an OR gate 194. Accordingly, the output thereof at line 196 assumes low status to derive a signal carrying a later described logon select signal identified as, $\overline{LOGONSEL}$.

Recalling from FIG. 4 that a one-second delay is imposed at state S7, this one-second delay is derived by virtue of the coupling of the low transition at line 180h from gate 190 through line 198 to the trigger, T, terminal of a one-shot multivibrator 200. Device 200 may be present as a type 556 oscillator which, by appropriate coupling of resistances and capacitances thereto, may provide a pulse of fixed length (1 second) at its Q output represented line 202. This one-second pulse is a logic high, and line 202 may be seen to be directed to the active low input of an AND gate 204. The opposite input to gate 204 derives from line 206 which, in turn, is coupled to line 166h which, as discussed above, carries the $\overline{S7}$ signal. Accordingly, with the $\overline{S7}$ signal being low, upon the termination of the one-second interval timed out by one-shot multivibrator 200, line 202, becomes low to, in turn, provide a low output at line 180b, representing a $\overline{TOS1}$ signal, a command for the system to enter state S1. Multivibrator 200 may, for example, be a type 556 timer marketed by Signetics Corporation.

Looking momentarily to FIG. 2, line 58h of line grouping 58 has been described as carrying a strobe signal from controller circuitry 60. This signal is a general indication to the video terminal circuit 52 that a key of keypad 26 has been pressed or that an operation representing the effect of such a key depression has been carried out. Returning to FIG. 6, this strobe input is represented by the signal identified as "$\overline{STROBE}$". The $\overline{STROBE}$ signal is generated by a one-shot multivibrator 208 which is configured to provide a 1 ms pulse in response to a negative going pulse at its trigger, T, input. When so triggered, the requisite strobing pulse is derived at its Q output and asserted along line 210 to an inverter 212 for presentation at line 58h. Video terminal circuit 52 responds to a $\overline{STROBE}$ pulse input to carry out the transmission of a keyboard or memory-derived character to the host computer. Because of the relative shortness of the $\overline{STROBE}$ pulse, a series capacitor 214 is coupled to the trigger, T, terminal of multivibrator 208, as well as to the output of an OR gate 216. Thus, as the output of gate 216 assumes a logic low status, capacitor 214 will discharge quickly to ground to, in turn, pull the input to terminal T low. The capacitor then charges quickly to a high logic level through resistor 218 even though the output of gate 216 remains low to assure that the triggering input pulse to terminal T is shorter than the desired 1 ms output pulse at line 210.

As noted above, two conditions obtain for causing the triggering of multivibrator 208 to derive the $\overline{\text{STROBE}}$ signal, either the depression of a key or the automatic carrying out of a logon or logoff message character string. Such dual conditions are represented by the inputs to OR gate 216. For example, line 166e is shown labeled as carrying the $\overline{S4}$ signal and, thus, as the system enters state S4, the input at line 166e assumes a low state to cause the carrying out of a $\overline{\text{STROBE}}$ signal. Thus, referring to FIG. 4, after the state S6, resulting from the depression of a keyboard key, the immediate entry into state S4 effects the development of a strobe input to video terminal circuit 52.

Looking to the opposite input to OR gate 216, line 220 extending thereto is shown coupled with the active low output of AND gate 222. An active low output at gate 222 requires a corresponding dual active low input thereto. One such input is derived through lines 224 and 226 from the output of an inverter 228. Looking additionally to FIG. 7, the input to inverter 228 at line 230 is derived from an oscillator 232, which may be present as a type 556 timer as described above. Oscillator 232 provides a cleanly defined TTL level square wave at a 25 Hz frequency, a frequency selected in correspondence with the limitations of a conventional telephone linkage, such limitation being about 300 baud, or 30 characters per second. Returning to FIG. 6, with the imposition of a 25 Hz square wave at line 230, AND gate 222, in effect, functions as a clock for generating a $\overline{\text{STROBE}}$ signal and establishing the rate of automatic transmission of the logon and logoff character strings.

The opposite input to AND gate 222 is present at line 234 which, in turn, extends from the output of OR gate 236. One input to gate 236 is present at line 238 which extends to line 166b carrying the $\overline{S1}$ signal representing a state S1 condition. Accordingly, AND gate 222 is enabled during an S1, logon, state. The opposite input to OR gate 236 is present at line 240 which, in turn, leads to line 166d which, as described earlier herein, represents a state S3 condition, carrying the $\overline{S3}$ signal. Referring additionally to FIG. 4, it may be observed that a logoff procedure is automatically carried out during state S3. Note additionally that line 238 extends to one input of OR gate 194 for developing the earlier described $\overline{\text{LOGONSEL}}$ signal at line 196 during state S1.

AND gate 242 is shown having an active low input at line 166c coupled to receive the $\overline{S2}$ signal corresponding with state S2 in ANDed combination with a $\overline{\text{KEYDET}}$ signal from along line 244. It may be recalled from FIG. 4 that when the system is in a state S2 (idle), one of the available transitions is to state S6. Accordingly, the opposite input to gate 242 at line 244 is arranged to receive a $\overline{\text{KEYDET}}$ signal, the derivation of which is described later herein as being in correspondence with the depression of a key within keypad assembly 26. Accordingly, when a key is pressed, a $\overline{\text{TOS6}}$ signal is generated as an active low at line 180g.

Another AND gate 246 is shown having one active low input coupled in common with the S2 state line 166c through line 248. The opposite active low input to gate 246 is derived from line 250 and is shown receiving a signal identified as $\overline{\text{ETXSYNC}}$. Looking additionally to FIG. 4, it may be observed that a transition from state S2 to state S3 occurs with the receipt of an $\overline{\text{ETX}}$ signal representing the command of the host computer to carry out a logoff procedure during an ensuing state S3. Accordingly, the output of gate 246 of line 180d develops a $\overline{\text{TOS3}}$ signal for assertion at encoder 178 (FIG. 5).

Line 248 also extends to another AND gate 252. The opposite input to gate 252 derives from a momentary actuation of reset button 32. This reset switch 32 is coupled through line 254 to the input of an inverter 256. Line 254 additionally is coupled through a pullup resistor 258 to +5 v such that, in the event of a switch defect, the input to gate 256 will remain at a high value. The inverted output of inverter 256 at line 260 is directed to the opposite input of gate 252. Accordingly, with the ANDed condition of a state S2 and the depression of the reset button, an active low condition obtains at line 262 which is directed to an active low input of OR gate 264 to provide a corresponding low at output line 180a thereof representing a $\overline{\text{TOS0}}$ signal commanding the system to go to a state S0 condition. FIG. 4 further reveals that with a continuous reset or defect condition, the system will always return to state S0, and even with the presence of a carrier detect signal and subsequent state S1 logon procedure, the system will continuously loop from state S2 back to state S0 to indicate a malfunction. Thus, if a continuous sending of a logon message is perceived, maintenance personnel will have an improved opportunity to identify the source of a defect.

An AND gate 262 also is shown having one active low input coupled through line 264 to reset line 260. The opposite input to this gate is line 166f which carries the state S5 signal, $\overline{S5}$. Again observing FIG. 4, it may be seen that state S5 transitions to state S0 upon the occurrence of a reset signal, and this logic combination is present at the input of gate 262. The output thereof at line 266 also is coupled to the input of multiple input OR gate 264 to derive a $\overline{\text{TOS0}}$ signal as before.

AND gate 266 is shown having one active low input coupled to line 166d such that it will receive the $\overline{S3}$ signal representing a state S3 condition. The opposite active low input to gate 266 is present at line 268 which extends to line 270. Line 270 receives a $\overline{\text{DONE}}$ signal at the conclusion of a logoff signal as discussed later herein. Accordingly, at the conclusion of a state S3 logoff and in the presence of a message DONE signal, a command for transition to state S5, $\overline{\text{TOS5}}$, is evolved at line 180f extending from the output of gate 266. Thus, at the conclusion of an automatic logoff procedure, the system transitions to standby state S5 at which position it will remain until an actuation of reset button 32 or power loss and subsequent power up. Standby LED 69 (FIG. 2) is illuminated during state S5. In this regard, note that a line 272 extends from the $\overline{S5}$ line 166f to the input of an inverter 274. The output of inverter 274 at line 276 includes a current limiting resistor and is coupled through an LED to ground. Thus, the low $\overline{S5}$ signal is inverted at inverter 274 during state S5 condition to effect the illumination of a standby state indicator.

As indicated above, the third technique for achieving state S0 is, as described in connection with FIG. 4 at arc 120, the powering up of the system from a power off condition. This third approach is represented as the third input to multiple input OR gate 264. When power is applied to the system, an R-C network including capacitor 280 and timing resistor 282 is activated such that capacitor 280 is charged over a time constant of about 200 ms. As capacitor 280 is charged toward +5 v, its charging condition is interpreted as a low signal for about 100 ms whereupon the threshold condition at gate 264 line 284 is reached and gate 264 interprets the signal at line 284 as a logic high. Thus, during the first 100 ms following power up, line 180a is at a logic low assuring that the system will always commence operation within state S0. This arrangement is known as a "known power up entry." Diode 285, which is coupled about resistor 282, is utilized to accommodate for spurious losses of power. In this regard, diode 285 is coupled so as to rapidly discharge capacitor 280 and cause the system to return to a state S0 in the event of spurious, short duration power loss.

It may be recalled that the inputs of lines 238 and 240 to OR gate 236 provide for a condition of either logging on or logging off as represented by logic low at line 234. Line 234 additionally is coupled to line 286 which provides a $\overline{MSGEN}$ signal which will be seen to enable a memory component carrying the logon and logoff messages.

An OR gate 288 is shown within the system receiving the $\overline{TOS1}$ signal at line 290 from line 180b as well as the $\overline{TOS3}$ signal from line 180d through 292. Thus, the presence of a command to either of states S1 or S3 provides a low logic signal at output line 294 which will be seen to provide an address strobe (or enable) for memory and which is identified as $\overline{LDADR}$.

The transition from state S1 to idle state S2 has been described as being carried out in conjunction with a message done signal, $\overline{DONE}$. In this regard, note that line 268, carrying the latter signal, is combined at the active low input of AND gate 296 with the state S1 signal, $\overline{S1}$, at line 166b. The output of gate 296 at line 298 is submitted to one input of an OR gate 300, the output of which is line 180c. The latter line carries the corresponding transition command $\overline{TOS2}$. Inasmuch as state S4 also transitions to state S2, the opposite input to OR gate 300 is from line 166e carrying the $\overline{S4}$ signal.

Line 166g, carrying the signal $\overline{S6}$, is shown coupled directly with the $\overline{TOS4}$ signal line 180e. This direct connection represents an operating arrangement wherein, once state S6 is achieved, a transition immediately is made to state S4 in consequence of the timing of one clock pulse.

Referring to FIG. 8, the arrangement for carrying out a scanning response to operator utilization of keypad assembly 26 is revealed. Cable 28 is shown having a grouping of four column leads, COL1–COL4, which cooperates with a similar grouping of row leads, ROW-1–ROW4 at 312. These leads are arranged in a matrix within assembly 26 and are combined to provide a unique signal corresponding with the actuation of a given key. The leads 310 and 312 are shown coupled to a keypad encoder 314 which serves to scan and debounce the array of keys within assembly 26 and produce a binary coded output corresponding with the key pressed at its output terminals B1-B4 and B9. Encoder 314 may be present, for example, as a type MM5740AAF marketed by National Semiconductor Corporation. The scanning function carried out by encoder 314 is controlled under the input of a 100 KHz clock signal at its CLK terminal from line 162. This same line has been described as extending to the clock input of latch 160 in FIG. 5 as well as to line 184 in that figure. Line 162 derives its clock signal from lines 316 and 318 which extend from the Q output of an oscillator 320. Oscillator 320, for example, may be present as a type 556 timer described earlier herein.

Upon the detection of the depression of a key within assembly 26, encoder 314 generates a logic high at its data strobe output line 322 which is directed through line 324 to a data strobe control port thereof to immediately terminate such logic high. This generates a short, positive going spike which is directed through line 322 to the input of a cross-coupled latch configuration represented generally at 326. Formed of two NOR gates 328 and 330, a positive going pulse at line 322, in effect, sets network 326 to provide a logic low output at line 244 representing a $\overline{KEYDET}$ signal. It may be recalled from FIG. 6 that this signal was combined with the state S2 signal to provide a transition to state S6. Because the $\overline{S6}$ signal transitions upon one clock pulse to the $\overline{TOS4}$ signal, the latter state will ensue within one clock pulse. As represented in FIG. 8, the subsequent $\overline{TOS2}$ signal at line 180c causes the completion of the key actuation loop to return to state S2. Line 180c is shown in FIG. 8 as extending to the input of an inverter 332, thence along line 334 to the opposite input of network 326 at NOR gate 330. Accordingly, the set low signal at line 244 is returned to a logic high to remove the $\overline{KEYDET}$ signal and await a next key actuation by the operator.

With the depression of a key within keypad assembly 26, two events occur: (a) the $\overline{KEYDET}$ signal is generated at line 244; and (b) a 5-bit code unique to that key appears at output terminals B1-B4 and B9 of encoder 314. These terminals are shown connected by line grouping 334 to the A-E inputs of a read only memory (ROM) 336. The coded signal appearing at these terminals provides an address to selected ASCII standard codes corresponding with the key depressed. The resultant addressed output of ROM 336 then becomes present at its output ports Y1-Y7. ROM 336 may be present, for example, as a type 74188 marketed by Texas Instruments, Inc. (supra). The noted ROM 336 output terminals are shown connected with line grouping 338 which are designated as carrying the signals KP0-KP6. ROM 336 also is shown enabled by an MSGEN signal imposed from along line 340 to its chip select terminal, $\overline{CS}$. This signal represents the complement of the $\overline{MSGEN}$ signal generated at line 286 (FIG. 6).

Figure 9:
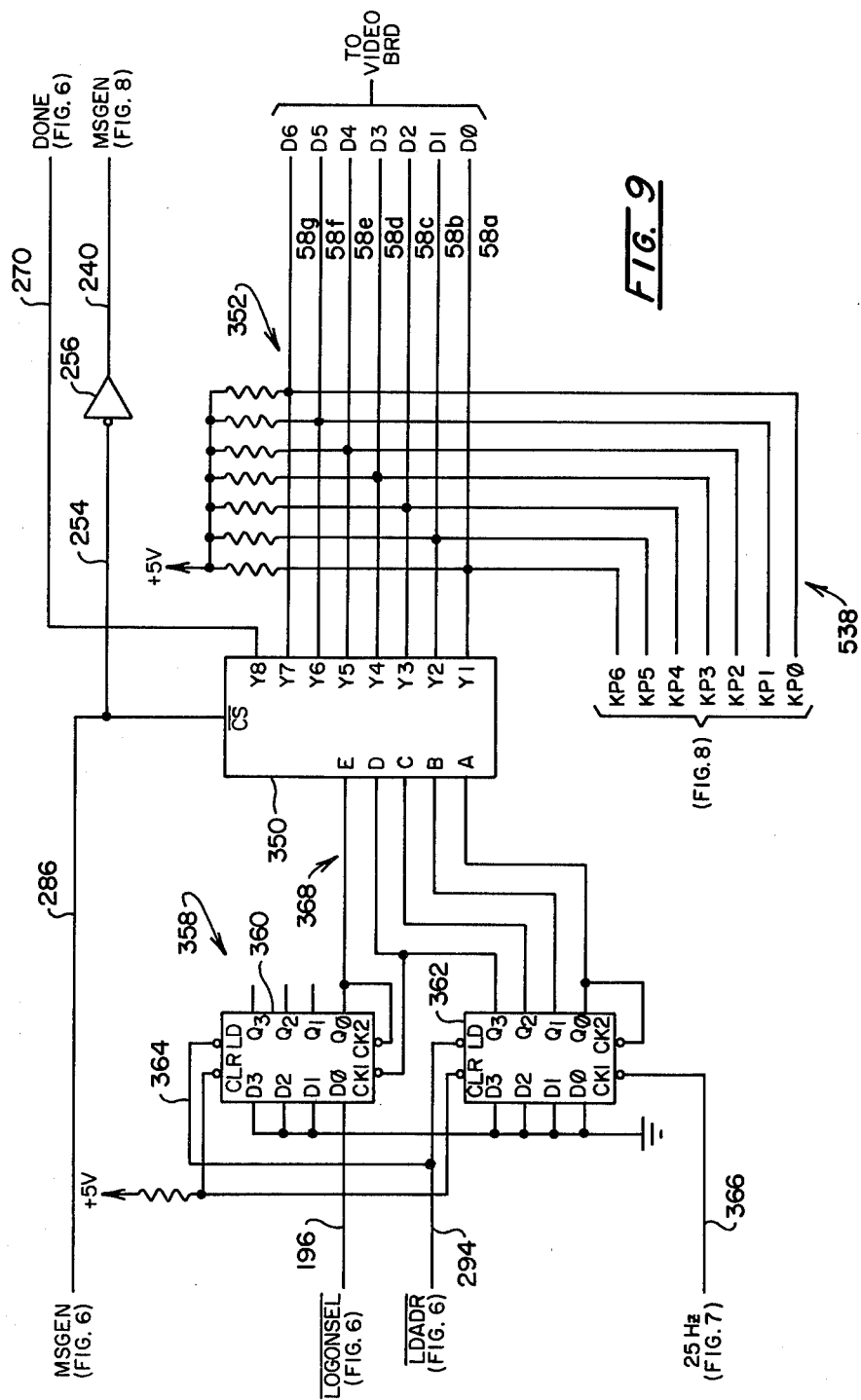
FIG. 9 is a circuit diagram showing message generating and multiplexing components of the controller circuit of the decoder of the invention.

Referring to FIG. 9, a message memory circuit arrangement for developing the earlier noted string of characters representing such messages as logon and logoff, is illustrated in conjunction with an input arrangement to the video terminal circuit 52. This arrangement has been described earlier as line grouping 58. The circuit arrangement selectively asserts either the memory retained messages or the inputs derived from keypad assembly 26. The logon and logoff messages, as well as any other messages represented by a character string, are retained in read only memory 350, the output of which is represented at terminals Y1-Y8 thereof. ROM 350 may, for example, be present as a type 74188 (supra). These outputs are of an open collector variety and, thus, line grouping 538, carrying keypad signals KP0-KP6, may be joined with corresponding outputs terminals Y1-Y7 as illustrated. In conformance with open collector configurations, an array of pull up resistors is shown at 352 coupled with a +5 v power supply and the line groupings. ROM 350 is enabled to output character strings in response to the earlier described $\overline{MSGEN}$ signal asserted at the chip select, $\overline{CS}$ terminal thereof from earlier described line 286. Correspondingly, note that line 354 is coupled between line 286 and an inverter 356 to provide the complementary signal, MSGEN, which is directed to the corresponding chip select terminal, $\overline{CS}$, of ROM 336, it being recalled that the latter memory serves to retain discrete key character data. Thus, a form of multiplexing for the two types of messages transmitted is provided. Either the actual keypad input will be transmitted or the message string of ROM 350 will be transmitted through line grouping 58 to the video terminal circuit 52 and, thence, to the host computer. Referring momentarily to FIG. 6, it may be recalled that OR gate 236 receives an input representing state S1 at line 238 or a corresponding input representing state S3 at line 240. The output of gate 236 at lines 234 and 286 derives the message generating enabling signal, $\overline{MSGEN}$. Inasmuch as the $\overline{MSGEN}$ signal is inverted at inverter 356, ROM 336 is inhibited during the enablement of ROM 350.

Message memory 350 is arranged having 32 memory locations which, for the instant embodiment, are equally divided between a logon and logoff character strings. For example, the logon string is retained within the ROM 0–15 locations, while the logoff character string is retained within ROM locations 16–31. These locations are addressed by an address counter network represented generally at 358 which is comprised of two mutually coupled 4-bit binary counters 360 and 362. These counters may be present, for example, as a type 74177 high speed monolithic counters marketed by Texas Instruments, Inc., Dallas, Texas. As described in conjunction with FIG. 6, the $\overline{LOGONSEL}$ signal at line 196 is derived both during state S1 and during state S7. This signal serves to commence counting by the loading of a logic low at line 196 to the D0 input terminal counter 360. Correspondingly, if the logic level at line 196 is high, a binary "1000," or 16, is loaded into the counter network 358. By asserting the $\overline{LOGONSEL}$ signal at state S7, an anticipatory setup of the appropriate preliminary count value is achieved to assure proper performance. This is achieved through the simple expedient of incorporating OR gate 194 within the system (FIG. 6). The appropriate initial addresses for logon and logoff are loaded in consequence of the assertion of the earlier noted $\overline{LDADR}$ signal derived at line 294. Note that line 294 extends to the LD terminal of counter 362 and is coupled through line 364 to the corresponding LD terminal of counter 360. Upon asserting this load signal, the inputs are transferred to the outputs of counters 360 and 362. Recall from FIG. 6 that the $\overline{LDADR}$ signal at line 294 is derived from the output of OR gate 288 and is developed when the system is about to enter state S3 or is about to enter state S1 as, respectively, represented at arcs 138 and 128 in FIG. 4. With the arrangement, the appropriate addresses are loaded just before logon and just before logoff.

Counters 360 and 362 are clocked at the earlier described 25 Hz rate as derived at line 230 in FIG. 7 and are shown inputted to counter 362 at line 366. In operation, the $\overline{STROBE}$ signal at line 58h (FIG. 6) is sent to video terminal circuit 52, following which a next address is clocked into ROM 350. The interconnection between counter network 358 and ROM 350 is provided by line grouping 368.

As indicated earlier in connection with FIG. 4, arcs 132 and 144 extending, respectively, from states S1 and S3 represent a message done form of command. This signal is derived from message memory 350 in association with the Y8 terminal thereof. In this regard, note that line 270 as described in connection with FIG. 6 extends from the noted terminal Y8. Y8 represents a null condition following the final character output of ROM 350 and represents a condition that either the logon or logoff message has been sent.

With the arrangement shown, the amateur user of the decoder and the system of the invention need not understand any of the more elaborate logging on or logging off procedures, such character string interaction with the host computer being automatically carried out. This logon and/or logoff message in addition to providing access to the computer operation program may provide for terminal or user identification assuring the appropriate security of the system and simplifying the identification of addresses, for example, for providing a books-by-mail library service. A similar form of identification may be utilized to provide for carrying out banking transactions through the system, although in the latter arrangement, the user may be called upon immediately following an initial automatic logon to identify further a confidential bank account number or the like.

Referring to FIG. 10, the synchronizing components of the decoder 14 are revealed. The carrier detect signal $\overline{CARDET}$ which is generated from modem 48 as presented at line 64 (FIG. 2), represents an indication that the host carrier has been received by the system and has been described in FIG. 4 at arc 124. Line 64 is shown coupled with the D input terminal of a type 7474D flip-flop or latch 370. This signal is permitted to be introduced at the falling edge of a pulse of a 100 KHz clock of the system. A proper logic condition for the decoder with respect to the receipt of a signal along line 64 is provided by a pull up resistor 372 coupled to $+5$ v power supply. The low logic level signal imposed upon carrier detection at line 64 is introduced to the D terminal of latch 370 and is acknowledged upon an appropriate receipt of a clock input at the clock terminal, C, from lines 374 and 376. Referring additionally to FIG. 8, line 376 is shown extending from an inverter 378, the input to which is provided from line 318. Thus, the clock input at line 374 is an inverted version of the corresponding clock at line 162. Assurance that the $\overline{CARDET}$ signal occurs on the falling edge of the 100 Hz clock pulse is provided by this arrangement and, accordingly, the Q output of latch 370 at line 192 carries the earlier described $\overline{CARDETSYNC}$ signal. The $\overline{Q}$ output of latch 370 is coupled with a line 380 which extends to energize an on-line LED described at 70 in FIG. 2. Thus, illumination of this perceptible indicator provides information to the operator that an answer has been received from the host computer at initial call up.

As described earlier herein, the commencement of a logoff procedure is in response to an $\overline{ETX}$ signal generated, ultimately, from the host computer and made available to the controller circuitry 60 from video terminal circuit 52. The input of this signal via line 66 again is reproduced in FIG. 10 as extending to the T input of a type 556 timer 382 which, for example, is marketed by Signetics, Corp. As before, a pull up resistor 384 is coupled with line 66 to accommodate for defects in wiring and the like. Timer 382 is used in a one-shot mode as a pulse stretcher in view of the short duration of the $\overline{ETX}$ signal itself. The resultant output at the Q terminal and line 386 has a one ms duration and is inverted at inverter 388 for presentation along line 390 to the D input of a D flip-flop 392. Flip-flop 392 may be present as a type 7474 in similar fashion as flip-flop 370. This input is clocked to the Q terminal, and line 250 in consequence of the 100 KHz clock pulse earlier described at line 376. The resultant $\overline{\text{ETXSYNC}}$ signal has been seen to cause the transition from state S2 to S3. Note that the set terminal, S, of flip flop 392 is coupled to receive an inverted version of signal $\overline{S2}$ from line 166c, gate 394 (used as an inverter) and line 396. Consequently, during all operational conditions wherein state S2 is not present, the logic level at line 396 is low and the corresponding set command causes the Q output at line 250 to have a logic high value. Thus, the $\overline{\text{ETX SYNC}}$ signal must achieve a low status in order to be asserted and cannot be asserted unless the system is in state S2. With such an arrangement, a spurious ETX signal derived from the host computer will be ignored unless the decoder 14 is in state S2.

Now considering the system and operation of decoder 14 in conjunction with a host computer and its program, a tree structured approach has been described as the arrangement by which simple interaction can be achieved between the host computer and the non-computer oriented user. Initial logging on correspondence between terminal 14 and the host computer is automatic and the sequence of logon characters automatically transmitted to the host computer will include a character sequence which may identify the transmitting terminal. The host computer program will include data identifying the address and name of the user of the terminal to permit an expansion of the utility of the entire view data system. Using a tree structured data access system, a series of screens will be displayed at the raster of T.V. receiver 12. For each page or node of data (which may include more than one screen), a numerical designation of level categories will be presented to the user requiring the selection of a numerical response to the host through the keypad assembly 26. However, certain of these responses will not be generated from numerically designated keys. An exemplary sixteen key keypad arrangement is set forth in the following tabulation.

| 1 | 2 | 3 | OOPS |
|---|---|---|---|
| 4 | 5 | 6 | GET |
| 7 | 8 | 9 | JUMP |
| BACK (NO) | 0 | FWD (YES) | DO IT |

With the tree structured data arrangement, an initial screen or page may, for example, call for the selection of one or more of a relatively small number of very general categories, for instance, encyclopedia, community information, financial services, library card catalog with book request service, and a bookmark function. Each of these categories will have a number associated with it, the initial ones being self-explanatory, while the bookmark function represents a portion of the host computer program which permits the decoder 14 user to terminate use at a particular page or screen of the host computer program and, upon a next utilization of decoder 14, commence at that point in the program at which the last utilization was terminated. The exemplary key designation set forth above, while including numerical designation for data selection, also includes yes and no instructions for interactive communication with the computer program as well as corresponding instruction to move forwardly or backwardly in a catalog arrangement. The term "DO IT" is a simplified representation of an execution form of key correspondingly, the term "OOPS" represents the command to delete an immediately preceding transmission, or, if pressed twice, to obtain assistance. The term "GET" represents an order on the part of the decoder 14 user to cause the host computer program to automatically mail a designated library book to the user or to cause a display of a particular screen within the data base. Recall in the latter regard that the initial logon character sequence contains characters identifying the name and address of the user. Thus, library services or other such services can be provided with minimal instruction required on the part of the user. The JUMP key provides a searching technique wherein the host computer is commanded to go up a current index, i.e. go up a next level of categorization, or for browsing from one data point to another.

The DO IT key provides a command termination similar to an enter key. Depression of the FWD key causes forward movement from one screen to another within a multiscreen item, while depression of the BACK key carries out the opposite function. These keys also may be used in conjunction with the JUMP key to provide direction in browsing. The associated NO and YES functions of these keys are used to confirm or cancel a transaction as in banking or book request interactions.

Since certain changes may be made in the above-described system and apparatus without departing from the scope of the invention herein, it is intended that all matter contained in the description thereof or shown in the accompanying drawings shall be interpreted as illustrative and not in a limiting sense.

I claim:

1. A viewdata system for disseminating information from the data base of a host computer by telephonic communication, comprising:

a host computer responsive to the establishment of telephone communication therewith from along a telephonic linkage for sending a carrier signal along said linkage, and having selectable programs each accessible for interactive communication along said telephonic linkage upon receipt of a predetermined logon sequence of characters transmitted thereto by telephone communication;

a decoder comprising:

coupling means for establishing a first level of communication by said telephonic linkage with said host computer wherein said carrier signal is received therefrom, and for subsequently effecting the telephonic reception from and transmission of data signals to said host computer;

keypad means having a plurality of manually actuable keys, each being identified with and corresponding to a function serving to interactively communicate with said host computer;

memory means for retaining first binary data representing a said logon sequence of characters selected for deriving a second level of communication with said host computer to effect access to a selected said program thereof, and retaining second binary data representing the said functions of said keypad means keys;

circuit means responsive to said coupling means reception of said carrier signal for commencing a finite delay interval of predetermined duration, and responsive at the termination of said delay to address said memory means first binary data and effect the transmission thereof by said coupling means so as to carry out said second level of communication, said circuit means thereafter being responsive to a said actuation of said keypad means keys for addressing said memory means second binary data corresponding therewith and effecting the transmission thereof by said coupling means to said host computer, and responsive to said data signals received by said coupling means from said host computer for generating output signals corresponding therewith; and modulator means, having an output connectable with the input of a visual readout display, for modulating said output signals with a select carrier to effect a display of character images corresponding therewith at said readout display.

2. The system of claim 1 in which:

said coupling means comprises an acoustic coupler;

said circuit means generates said output signals as video signals; and said visual readout display is a television receiver and said modulator means comprises an R.F. modulator responsive to modulate said video signals with said select carrier for effecting character imaging by said television receiver.

3. The system of claim 1 in which:

said decoder includes visual means for providing a perceptible system status indication when activated; and said circuit means is responsive to said carrier signal for activating said visual means.

4. The system of claim 2 in which said decoder includes a housing for retaining said memory means, said circuit means, said acoustic coupler and said R.F. modulator.

5. The system of claim 4 in which:

said keypad means is mounted within a hand-held assembly; and including elongate flexible cable means in electrical communication between said keypad means and said circuit means for operatively locating said hand-held assembly remotely from said television receiver.

6. The system of claim 2 in which said circuit means includes means responsive to the completion of said addressing said memory means and automatic transmission of said first binary data for generating a done signal to effect an idle state pending a said manual actuation of a said key.

7. The system of claim 1 in which:

said host computer is responsive to a telephonically received termination of transmission message derived by predetermined actuation of said manually actuable keys for generating and telephonically transmitting a predetermined termination command signal and is responsive to a subsequent telephonic communication present as signals representing a predetermined sequence of logoff characters to carry out the termination of an interactive association with said decoder;

said memory means retains third binary data representing said sequence of logoff characters; and said circuit means is responsive to said predetermined termination command signal for addressing said memory means and effecting automatic sequential transmission to said host computer means through said coupling means of said third binary data.

8. The system of claim 1 in which:

said host computer selectable program includes a tree-structured data bank configured for multi-level interactive location of catalogued items and is further configured for retaining multi-character defined identification of a given said decoder; and said decoder memory means first binary data include said characters representing said decoder identification.

9. The system of claim 8 in which a said decoder means memory means second binary data includes a character for effecting a command to said host computer to carry out a said catalogued item isolation and an associated said identification of said decoder.

10. A viewdata decoder for interactive communication with a host computer responsive to the establishment of telephone communication therewith for sending a carrier signal along said established telephonic communication and having selectable programs each accessible for interactive communication by said established telephonic communication upon receipt thereby of a predetermined logon sequence of characters comprising:

a housing;

acoustic coupling means for establishing a first access by telephone with said host computer wherein a carrier signal is received therefrom, and for subsequently effecting the telephonic reception from and transmission of data signals to said host computer;

keypad means having a plurality of manually actuable keys, each being identified with and corresponding to a function serving to interactively communicate with said host computer;

memory means for retaining first binary data representing a said logon sequence of characters selected for deriving a second access with said host computer to effect access to a selected said program thereof, and for retaining second binary data representing the said functions of said keypad means keys;

circuit means responsive to said acoustic coupling means reception of said carrier signal for commencing a finite delay interval of predetermined duration, and responsive at the termination of said delay to address said memory means first binary data and effect the transmission thereof by said coupling means so as to carry out said second access with said host computer, said circuit means thereafter being responsive to a said actuation of said keypad means keys for addressing said memory means second binary data corresponding therewith and effecting the transmission thereof by said acoustic coupling means to said host computer, and responsive to said data signals received by said acoustic coupling means from said host computer for generating output signals corresponding therewith; and modulator means, having an output connectable with the input of a visual readout display, for modulating said output signals with a select carrier to effect a display of character images corresponding therewith at said readout display.

11. The decoder of claim 10 in which:

said cicuit means generates said output signals as video signals; and said visual readout display is a television receiver and said modulator means comprises an R.F. modulator responsive to modulate said video signals with said select carrier for effecting character imaging by said television receiver.

12. The decoder of claim 10 in which:

said circuit means is responsive to any application of electrical power thereto from a power-off status to assume a ready state, and is responsive to the receipt of said carrier signal only when in said ready state to commence said finite delay interval.

13. The viewdata decoder of claim 10 further comprising:

visual means for providing a perceptible status indication when activated; and said circuit means is responsive to said carrier signal for 10 activating said visual means.

14. The decoder of claim 11 in which said housing retains said memory means, said circuit means, said acoustic coupling means and said R.F. modulator means.

15. The viewdata decoder of claim 14 in which:

said keypad means is mounted within a hand-held assembly; and including elongate flexible cable means in electrical communication between said keypad means and said circuit means for operatively locating said hand-held assembly remotely from said televion receiver.

16. The decoder of claim 10 in which:

said memory means retains third binary data representing a sequence of logoff characters selected to effect the carrying out of a termination of an interactive association with said host computer; and said circuit means is responsive to a predetermined termination command signal from said host computer for addressing said memory means third binary data and effecting automatic sequential transmission to said host computer through said acoustic coupler of said third binary data.

17. The decoder of claim 14 in which said acoustic coupler includes a transmitting acoustic coupler and a receiving acoustic coupler integrally mounted within said housing.

* * * * *